United States Patent [19]

Toman

[11] Patent Number: 4,905,460
[45] Date of Patent: Mar. 6, 1990

[54] MULCHING BAR FOR A CORE PROCESSOR OR POWER RAKE

[75] Inventor: Charles R. Toman, Lincoln, Nebr.
[73] Assignee: Cushman, Inc., Lincoln, Nebr.
[21] Appl. No.: 209,066
[22] Filed: Jun. 20, 1988
[51] Int. Cl.⁴ .......................................... A01D 55/00
[52] U.S. Cl. .................................................... 56/12.7
[58] Field of Search ................. 56/12.7, 53, DIG. 17, 56/121, 41, 156, 198, 220, 231, 234, 249, 294

[56] References Cited

U.S. PATENT DOCUMENTS

| | | | |
|---|---|---|---|
| 1,022,292 | 4/1912 | Anthony | 56/13.6 |
| 1,512,439 | 10/1924 | Worthington | 56/13.6 |
| 1,807,489 | 5/1931 | Middleton et al. | 172/123 |
| 2,266,307 | 12/1941 | Clemson | 56/294 |
| 2,363,331 | 1/1945 | Seaman | 94/40 |
| 2,671,300 | 3/1954 | Kinkead | 56/249 |
| 2,990,667 | 7/1961 | Schwalm | 56/12.7 X |
| 3,295,302 | 1/1967 | Lee | 56/12.7 X |
| 3,991,830 | 11/1976 | Shepherd | 172/180 |

FOREIGN PATENT DOCUMENTS 160385 5/1955 Australia .............................. 56/12.7

*Primary Examiner*—Thuy M. Bui
*Attorney, Agent, or Firm*—Welsh & Katz, Ltd.

[57] ABSTRACT

A mulching bar for a turf maintenance machine having a rotating flail reel includes an elongate body substantially triangular in cross section including a base, an upright portion and an inclined portion having lower and upper edge margins, the lower edge margin forming a blade edge with the base, the upper edge margin having a lip projecting beyond the upright portion, the mulching bar adapted to intercept cut or processed particles generated or collected by the rotating reel of the machine and to direct those particles into the reel for more complete comminution and eventual deposition upon the turf.

22 Claims, 1 Drawing Sheet

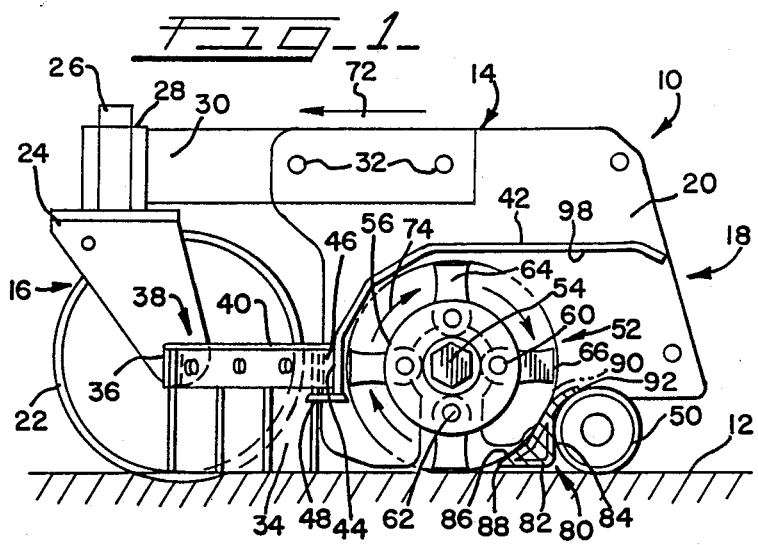
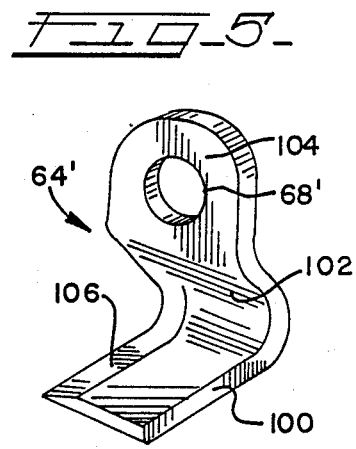
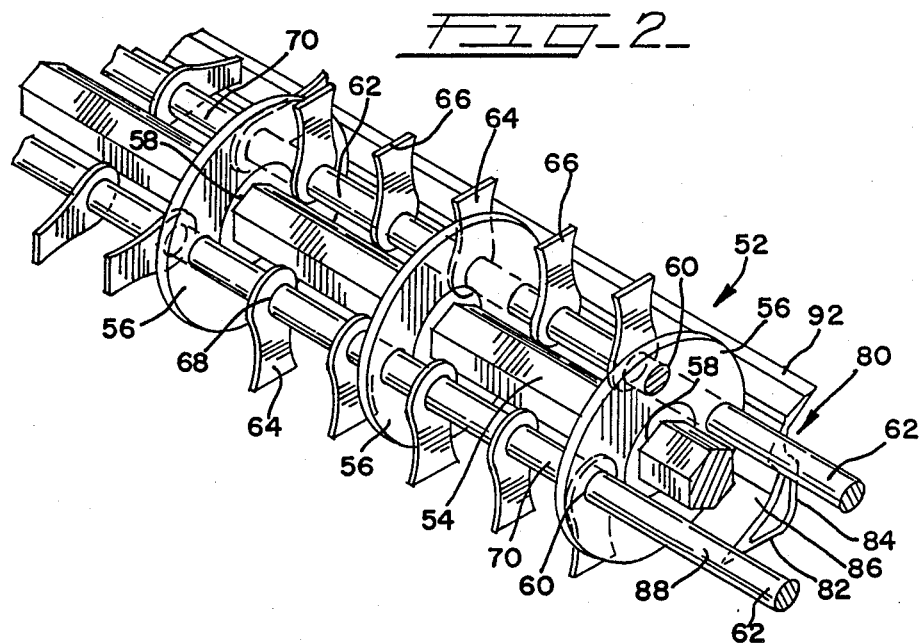
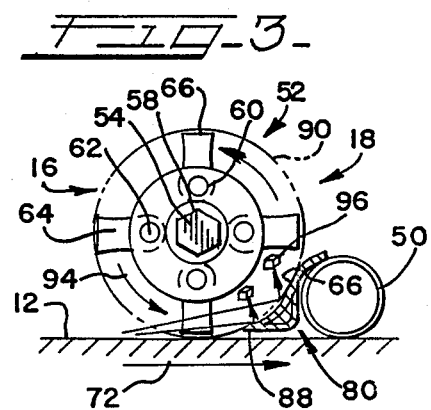
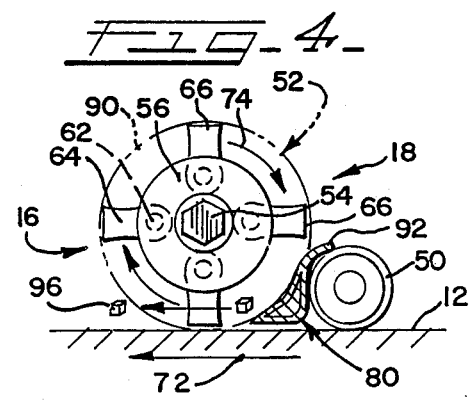

MULCHING BAR FOR A CORE PROCESSOR OR POWER RAKE

BACKGROUND OF THE INVENTION

The present invention relates generally to turf maintenance machines adapted to mill or process aerated cores, to mow and/or to power rake, and more particularly to a novel mulching bar adapted to improve the operational performance of such a maintenance machine by recycling the processed turf material for optimum results.

It is a common practice in the maintenance of turf surfaces, including residential and commercial lawns and golf courses, as well as relatively undeveloped turf surfaces, to perform a number of horticultural and/or agronomic maintenance tasks including, but not exclusively restricted to flail mowing, processing aerated cores, power raking or verticutting, the latter process involving the subsurface cutting of turf rhizomes. In some cases, several of these operations may be performed by a single machine adapted to be coupled to the front end of a tractor or other self-propelled turf maintenance vehicle. Such a machine, referred to hereinafter as a core processor/power rake (CP/PR), includes a transverse rotating flail reel assembly having a plurality of radially projecting impact elements or blades especially adapted for the specific operation, i.e., mowing, core processing, or power raking.

As the CP/PR travels across the turf surface, the reel is adapted to flail, cut, rake, process aerated cores, etc., as called for in the particular process, and to deposit the processed material upon the turf surface. When used for core processing, it is common for the impact elements to fail to collect all cores in a single pass. Thus, in many instances, the CP/PR must make multiple passes to collect and adequately process the residue left on the turf by an aerator or by the first pass of the CP/PR. The residue is processed by further comminution or pulverization to facilitate its decomposition and to distribute a relatively uniform layer of organic material upon the turf.

It is preferred that a single machine perform both the initial turf maintenance operation as well as the residue comminution or pulverization operation. In the case of the mowing operation, conventional rotary mowers, called "mulching mowers", have been adapted to redirect the flow of cut grass into the rotating blade so as to reduce the bulk of the clippings and thus distribute them upon the turf as a mulch having beneficial horticultural properties. However, conventional CP/PRs are not capable of directing or redirecting the flow of processed particles into the rotating reel. In the case of aeration, in which cylindrical cores or plugs composed of grass, roots and soil are pulled from the turf to encourage turf root development, the cores which are left on the turf surface need to be ground or pulverized, both to return the soil nutrients to the turf and to remove the unsightly cores from the turf surface. Thus, the adequate pulverization of aerated cores is important to proper turf maintenance.

Thus, there is a need in the turf maintenance industry for a single machine capable of performing the operations of mowing, core processing, and/or power raking, as well as the corresponding residue processing operation. Accordingly, the mulching bar of the invention is designed to be mounted on a conventional CP/PR turf maintenance machine so as to direct the flow of processed particulate turf material into the rotating flail reel for more complete comminution.

SUMMARY OF THE INVENTION

A mulching bar for a turf maintenance machine having a rotating transverse flail reel assembly adapted to perform a specified turf maintenance process involving the creation and/or processing of a residue of turf material, wherein the mulching bar is adapted to direct the larger particles of processed material into the rotating reel assembly for more complete comminution and eventual deposition upon the turf surface.

More specifically, the mulching bar of the invention is adapted to be located on a CP/PR machine in substantially closely spaced relationship to the rotating reel assembly, and between a portion of the reel assembly and the turf surface so as to intercept and collect a significant portion of the particles generated by the specific process being performed, as well as to direct the larger and heavier particles back into the reel assembly for more complete comminution.

The mulching bar includes a tubular, triangular-shaped body having a base, an upright portion and an inclined, preferably concave deflecting portion. The intersection of the inclined portion and the base is formed into a wedge or blade designed to pass more easily through the turf and to be positioned as close to the rotating reel as possible between the reel and the turf surface. The inclined concave surface may be provided with a lip at its upper end to facilitate the deposition of comminuted particles upon the turf surface and away from the operating components of the machine. In addition, a novel shear plate and mowing blade are provided to further increase the versatility and efficiency of the CP/PR machine.

BRIEF DESCRIPTION OF THE DRAWING

FIG. 1 is a side elevation of a CP/PR machine incorporating mulching bar and shear plate of the invention, with a portion of the machine removed;

FIG. 2 is a perspective elevation of the reel of the CP/PR turf maintenance machine of FIG. 1 including the mulching bar of the invention;

FIG. 3 is a fragmentary side elevation of the machine of FIG. 1 shown adapted for downmilling;

FIG 4 is a fragmentary side elevation of the machine of FIG. 1 shown adapted for upmilling; and FIG. 5 is a perspective elevation of a mowing blade adapted to be used in the reel assembly of FIG. 2.

DESCRIPTION OF THE PREFERRED EMBODIMENT

Referring now to the drawings, FIG. 1 depicts a core processor/power rake machine (CP/PR) designated generally by the reference numeral 10. The CP/PR 10 is coupled to a conventional tractor or other turf maintenance vehicle (not shown) which propels the CP/PR along the turf surface 12. The CP/PR 10 includes a frame 14 having a front end 16, a rear end 18, and a pair of end plates 20, one of which has been removed in FIG. 1 for purposes of explanation. The frame 14 also includes a front gage wheel 22 attached to a castor bracket 24 for axial rotation. The castor bracket 24 is provided with a vertically projecting pin 26 adapted for swiveling action within a bore 28 of a gage wheel mounting bracket 30. In the preferred embodiment, each end plate 20 is provided with a gage wheel 22 and brackets 24 and 30. Each gage wheel mounting bracket 30 is mounted to the respective end plate 20 by a pair of conventional fasteners 32, which in the preferred embodiment are threaded bolts. The frame 14 also includes a rubber skirt 34 which is mounted in depending fashion to a lip 36 of a bracket 38, and is positioned on the front end 16 of the frame 14 between the end plates 20 to extend almost to the turf surface 12. The bracket 38 includes a top 40, which, with the skirt 34, is designed to prevent particulate material processed by the CP/PR 10 from being ejected forward of the machine during operation.

A substantially 'J'-shaped reel housing 42 is secured to the frame 14 between the two end plates 20 and is provided with a front surface 44 located closely adjacent or in abutting relationship to a rear end 46 of the bracket 38. The housing 42 is adapted to serve as both a guard which prevents the turf material generated by the reel from being ejected outwardly, thus creating a hazard to turf maintenance personnel, as well as a deflector to direct the particulate turf material back towards the rear 18 of the CP/PR 10 and upon the turf surface 12.

An elongate planar shear plate or bar 48 is mounted to the front end 16 of the frame 14 with its length perpendicular to the plane of each of the end plates 20 and its width defining a plane parallel to the turf surface 12. The shear plate 48 is mounted to the frame 14 near the gage wheel mounting bracket 30 and beneath a lower edge of the surface 44. The CP/PR 10 also includes a rear gage roller 50 which may either be a single roller as shown or may be a plurality of individual wheels.

Referring now to FIGS. 1 and 2, a reel designated generally by the reference numeral 52 is mounted transversely upon the frame 14 of the CP/PR 10 for axial rotation therein. The reel 52 is located between the end plates 20 and is substantially parallel with the shear plate 48. The reel 52 also includes a centrally mounted drive shaft 54 which, in the preferred embodiment is hexagonal, but may alternately be square or round. The shaft 54 is driven by a direct drive hydraulic motor (not shown). The reel 52 also includes a plurality of generally circular disc plates 56 mounted in spaced relationship to each other and coaxially upon the shaft 54. Each plate 56 includes a central axial bore 58 dimensioned to matingly engage the drive shaft 54, as well as a plurality of peripheral bores 60 which are preferably located in regularly spaced relationship to each other. The corresponding bores 60 of the disc plates 56 are in registry with each other and are dimensioned to matingly accommodate the insertion of a blade support pin 62 therein. In the preferred embodiment, four such support pins 62 are employed.

A plurality of turf maintenance impact elements or blades 64 are provided, each blade 64 having an edge portion 66 and an eyelet 68 at the opposite end, the eyelet adapted to matingly engage the blade support pin 62. In the preferred embodiment, at least two laterally flattened blades 64 are positioned upon each support pin 62 and between each plate 56. The blades 64 are preferably mounted to the support pin 62 for pivotal action, but may alternately be fixed thereto, depending on the desired turf maintenance process to be performed. The movement of the blades 64 laterally upon the pins 62 is prevented by a plurality of sleeves or spacers 70, each journaled on the pins 62. One sleeve 70 is located between each adjacent pair of blades 64, and between the blades and next adjacent disc plates 56. In FIGS. 1-4, the blades 64 are shown to be straight flail-type blades, and are adapted for pivotal action about the blade support pins 62. The straight flail blades 64 are designed to be used when the CP/PR 10 is used for verticutting operations in which thatch and other organic material is removed from the turf in a pattern of elongate parallel grooves, as well as for power raking and core processing.

Conventional CP/PR machines are propelled along the turf surface 12 in the direction indicated by the arrow 72 (best seen in FIG. 1). The blades 64 are driven by the reel 52 in the direction indicated generally by the arrows 74 and, depending on the operation being performed, generate and/or process particles of turf and/or soil, which are eventually ejected from the rear 18 of the machine 10. The blades 64 are adapted to perform the designated operation by virtue of the high speed impact thereof against the turf. When the particles are incompletely pulverized by conventional CP/PR machines, or in some cases missed by virtue of the location of the particles between two blades 64, the particles are left as an unsightly residue on the turf surface 12. Normally, a supplemental pass is required to eliminate these residues by further pulverization. The mulching bar 80 of the invention is provided in order to alleviate the need for such a supplemental pass.

Referring to FIGS. 1 and 2, the mulching bar 80 is provided in a length which corresponds to the length of the reel 52 and is substantially triangular in cross-section. In the preferred embodiment the bar 80 is fixed to the frame 14 between the end plates 20 and is tubular in configuration, having a base 82, an upright portion 84 and an inclined portion 86. The bar 80 is preferably fabricated in two parts, the inclined portion 86 being one such part and the 'L'-shaped configuration formed by the base 82 and the upright portion 84 being the second such part. These two parts are integrally joined, as by welding, to form the bar 80.

The base 82 is shown to be generally planar in configuration, but alternately may be slightly convex to facilitate the riding action of the bar 80 over the turf surface 12 when the CP/PR 10 is in operation. The leading edge of the base 82 and the lower edge of the inclined portion 84 join to form a generally wedged shaped blade formation 88 designed to collect as many particles as possible and to draw them into the rotating blades 64. The inclined portion 86 is preferably provided with a generally concave configuration to permit the mulching bar 80 to be placed as close as possible to the diameter of operation 90 defined by the outer edges 66 of the blades 64.

The mulching bar 80 may also be provided with a deflecting lip 92 which is integral with the inclined portion 86 and is formed at the intersection of the upper configuration reverse to the configuration of the inclined portion 86, and projects at an angle therefrom, resulting in a generally 'S'-shaped sectional configuration of the combined inclined portion 86 and lip 92. The concave configuration of the lip 92 is designed to prevent particles from falling between the bar 80 and the rear gaging roller 50, where they would be eventually compressed into the turf surface 12.

The mulching bar of the invention 80 is designed to be positioned between the outer diameter of operation 90 of the reel 52 and the rear gaging roller 50 so that larger particles of turf residue generated and/or collected by the action of the blades 64 upon the turf surface 12 will be directed back into the reel assembly for more complete pulverizing or comminution. Thus, the mulching bar 80 enables the CP/PR machine 10 to both perform a turf maintenance operation such as power raking or core processing, and also to sufficiently comminute the processed residue to obviate the need for supplemental collection or processing equipment.

In operation, and referring now to FIG. 3, depending on the direction of rotation of the shaft 54, the CP/PR 10 incorporating the mulching bar 80 of the invention may be adapted for specialized processing. When the shaft 54 is driven in the direction indicated by the arrows 94, the CP/PR 10 performs a downmilling operation. In downmilling, a process normally employed in areas having sandy soils, the turf particles 96 are flung against the inclined surface 86 which acts as a breaker bar. Depending on their weight, the broken particles 96 are then flung upwardly back into the rotating reel 52 for further comminution or pulverization, and, if they are of light enough weight, are ejected from the rear 18 of the machine 10 to be deposited upon the turf surface 12. Downmilling may also be used when the operator desires to aerate first and then follow it with a short vertical mowing operation, or alternately dethatch after pulverizing the cores.

Referring now to FIGS. 1 and 4, when the shaft 54 is rotated in the direction indicated by the arrows 74, the reel 52 is adapted for upmilling. In this operation, commonly used by professional turf maintenance personnel, the particles 96 are swept upwardly in front of the reel 52. In conventional CP/PR machines, the larger particles of turf residue such as aerated cores including a complement of soil, are swept into the reel and ejected out the rear of the machine, often being only partially pulverized. In the present invention, the reel 52 sweeps the particles 96 upward, where the heavier particles impact the shear plate 48 and are at least partially pulverized, with the heavier particles 96 falling to the turf surface 12, and the lighter weight particles remaining entrained in the reel 52. Depending on the operational velocity of the CP/PR 10, these heavier particles 96 may be reprocessed by the reel 52 on this same pass over the turf surface 12, in which case the blades 64 would rethrow the particles against the shear plate 48, repeating the cycle.

The lighter weight particles 96 collected by the reel 52 are then thrown against an inner surface 98 of the housing 42 for further pulverization, the object of which is to eject them from the rear 18 of the CP/PR 10 for deposition upon the turf surface 12. If the particles 96 passing through the housing 42 are still heavy enough that they are not ejected from the CP/PR 10, they will fall upon the mulching bar 80 which redirects them through the reel 52 for another cycle of pulverization. The presence of the lip 92 prevents recycled pulverized material from falling in front of the rear gage wheel 50 where it would be compressed into the turf surface, causing undesirable compaction.

Referring now to FIG. 5, an alternate configuration of the blade to be used by the reel 52 is shown and designated by the reference numeral 64'. The blade 64' has a general double bent back configuration with a generally horizontal base 100, a bent back upright portion 102 and a substantially vertically projecting upper portion 104 having an eyelet 68'. A forward edge 106 of the base 100 is sharpened. The double bent back configuration of the blade 64' is designed to balance and stabilize the blade 64' against the centrifugal force exerted by the reel 52 and to maintain the blade edge 106 substantially parallel with the turf surface 12. The blade 64' is preferably designed for use in flail mowing, in which case the plurality of blades 64' would be pivotably fixed to the respective pins 62. The blade 64' may also be used to process cores. Although only two types of blade configurations have been disclosed herein, it is contemplated that any one of several conventional CP/PR reel blades may be used with the mulching bar 80 and/or the shear plate 48, depending on the maintenance process being performed.

While particular embodiments of the mulching bar for the CP/PR have been shown and described, it will be appreciated by those skilled in the art that modifications and alterations may be made to the device as described without departing from the invention in its broader aspects.

Various features of the invention are set forth in the following claims.

What is claimed is:

1. A turf maintenance machine comprising:
a frame;
an axially rotatable flail reel mounted transversely to said frame and including a plurality of impact elements or blades, said machine being adapted to travel along a turf surface and to perform a maintenance operation through the rotating action of said reel, whereby said operation processes and/or generates a residue of particulate material; and
a mulching bar located on said frame in closely spaced relationship to said reel, said bar being constructed and arranged so as to collect and/or direct said material into said rotating reel for more complete processing and eventual deposition upon said turf surface.

2. The machine defined in claim 1 wherein said mulching bar is located on said machine along a rear side of said reel and proximate to the turf surface.

3. The machine defined in claim 1 wherein said bar is substantially triangular in cross section, having a base, an inclined portion and an upright portion.

4. The machine defined in claim 3 wherein said inclined portion is concave.

5. The machine defined in claim 3 wherein said base of said blade is substantially planar.

6. The machine defined in claim 3 wherein said base of said blade is convex.

7. The machine defined in claim 3 wherein said inclined portion has an upper edge provided with a lip.

8. The machine defined in claim 1 wherein said reel is provided with a plurality of blades adapted for core processing.

9. The machine defined in claim 8 wherein each of said blades is substantially flattened and has an eyelet at one end and an edge at an end thereof opposite to said eyelet end.

10. The combination defined in claim 1 wherein said reel is provided with a plurality of blades adapted for power raking.

11. The machine defined in claim 1 wherein said reel is provided with a plurality of blades adapted for flail mowing.

12. The machine defined in claim 11 wherein each of said blades has a base with a sharpened forward edge, a double bent back upright portion secured to said base, and an upper portion with an eyelet.

13. The machine of claim 1 wherein said machine is provided with a shear plate.

14. The machine of claim 13 wherein said shear plate is located in closely spaced parallel relation to said reel.

15. The machine of claim 14 wherein said shear plate is located on a side of said reel opposite the location of said mulching bar.

16. A mulching bar for a turf maintenance machine, comprising an elongate body being substantially triangular in cross section, said body including a base, an upright portion and an inclined portion with a lower edge margin and an upper edge margin, said lower edge margin forming a blade edge with said base, said upper edge margin having a lip projecting beyond said upright portion.

17. The bar defined in claim 16 wherein said inclined portion is concave in curvature.

18. The bar defined in claim 17 wherein said lip is provided with a reverse curvature to said inclined portion.

19. The bar defined in claim 16 wherein said lip projects in an angle in relation to said upper edge margin.

20. The bar defined in claim 16 wherein said bar is tubular in form.

21. The bar defined in claim 16 wherein said base of said bar is slightly convex.

22. A blade for a turf maintenance machine having an axially rotating transverse flail reel and a plurality of blades secured thereto and projecting radially therefrom, the machine being adapted to travel along a turf surface and to perform a maintenance operation through the rotating action of the reel, said blade comprising:
- a generally planar base having a sharpened leading edge and being positioned substantially parallel relative to the turf surface, said parallel position of said edge being maintained during the operation of the reel;
- a double bent back upright portion integral with said base; and
- an upper portion integral with said upright portion and provided with an eyelet, said eyelet being disposed transversely to said leading edge so as to balance and stabilize said blade and to maintain said sharpened edge parallel to the turf surface.

* * * * *